United States Patent
Silva

[11] Patent Number: 5,915,708
[45] Date of Patent: Jun. 29, 1999

[54] MUD FLAP MOUNT

[76] Inventor: Ronald J. Silva, 9128 South, Selma, Calif. 93662

[21] Appl. No.: 08/976,738

[22] Filed: Nov. 24, 1997

Related U.S. Application Data

[60] Provisional application No. 60/031,728, Nov. 25, 1996.

[51] Int. Cl.$^6$ .................................................... B62D 25/18
[52] U.S. Cl. ............................................ 280/154; 280/851
[58] Field of Search ..................................... 280/847, 848, 280/154, 851

[56] References Cited

U.S. PATENT DOCUMENTS

| | | |
|---|---|---|
| 2,572,774 | 10/1951 | Smith et al. ............................... 280/848 |
| 3,219,363 | 11/1965 | Dalsey et al. ............................ 280/851 |
| 3,650,543 | 3/1972 | Evans . |
| 3,684,312 | 8/1972 | Evans . |
| 3,700,260 | 10/1972 | Moore . |
| 3,711,119 | 1/1973 | Hollingsworth . |
| 3,726,544 | 4/1973 | Miller ................................ 280/154.5 R |
| 3,778,086 | 12/1973 | Moore ............................... 280/154.5 R |
| 3,782,757 | 1/1974 | Juergens . |
| 3,822,897 | 7/1974 | Heath . |
| 3,899,193 | 8/1975 | Evans ....................................... 280/851 |
| 3,934,901 | 1/1976 | Hammerly . |
| 4,180,230 | 12/1979 | Sogoian . |
| 4,319,764 | 3/1982 | Whitaker et al. . |
| 4,335,862 | 6/1982 | Sherman . |
| 4,359,232 | 11/1982 | Maccari . |
| 4,572,532 | 2/1986 | Farly . |
| 4,726,599 | 2/1988 | Antekeier . |
| 4,856,816 | 8/1989 | Francis . |
| 4,923,215 | 5/1990 | Williams . |
| 5,026,094 | 6/1991 | Haddox . |
| 5,044,667 | 9/1991 | Manning ................................. 280/851 |
| 5,121,944 | 6/1992 | Haddox . |
| 5,676,389 | 10/1997 | Richardson . |

*Primary Examiner*—Lanna Mai
*Assistant Examiner*—Michael Mar
*Attorney, Agent, or Firm*—Richard A. Ryan

[57] ABSTRACT

A mud flap mount for releasably mounting mud flaps to vehicles, including automobiles, trucks, trailers and the like, to prevent damage to the mounting system, vehicle or mud flap when excessive downward force is exerted on the mud flap. The mud flap mount of the present invention comprises a planar member that connects to and extends downward from the angle bracket found under most vehicles. A shaped member attaches to the planar member, forming a cavity between the planar member and the shaped member. An opening is formed at the bottom of the cavity. The enlarged upper section is an insert member is slidably received within the cavity and releasably held by the planar member and shaped member until a downward force of a predetermined amount is applied to the mud flap, causing the upper section of the insert member to exit the cavity through the opening. By releasing the insert member upon application of a predetermined amount of force, the mud flap mount prevents damage to the mud flap, mount and vehicle.

19 Claims, 4 Drawing Sheets

MUD FLAP MOUNT

CROSS-REFERENCE TO RELATED APPLICATIONS

This application claims the benefit of U.S. Provisional Application No. 60/031,728, filed Nov. 25, 1996.

BACKGROUND OF THE INVENTION

1. Field of the Invention

The field of the present invention relates generally to apparatuses for releasably mounting a mud flap to a vehicle, such as an automobile, truck, trailer and the like. More particularly, the present invention relates to apparatuses that allow a mounted mud flap to be detached from the vehicle without damaging the mounting apparatus, vehicle or mud flap.

2. Background

For the purposes of the present invention, the term "vehicle" includes motor vehicles, such as automobiles and trucks, trailers and the like, which utilize mud flaps. Most vehicle operators who operate vehicles which utilize mud flaps, particularly drivers of commercial delivery trucks and the like, are all too familiar with the problems associated with the use of mud flaps. During backing operations, the mud flap can be caught between the vehicle and a generally incompressible surface, such as a curb or loading dock, or between the vehicle tire and the ground surface. When this happens, a significant amount of force is exerted on the mud flap causing either destruction of the mud flap or the mud flap mounting system. The destruction of the mud flap or mounting system results in vehicle and driver "down-time" until the mud flap is replaced or repairs are made to the vehicle. Damage can cost hundreds or thousands of dollars to repair and result in one or more days of lost driving time (in addition to the lost company time to repair the vehicle).

The typical, most commonly used mud flap mounting systems consists of an angle bracket made of steel or steel-like material that is attached to the underside of the vehicle. One or more mud flaps bolt directly to and hang down from the angle bracket. The typical set-up utilizes a angle bracket that is 24 inches wide across with a single mud flap of the same width bolted to the angle bracket with four bolts. Problems occur when the mud flap is pulled downward with sufficient force to either tear the mud flap or to separate the angle bracket from the truck or trailer. Under some circumstances, the destruction of the mud flap or mounting system can cause additional damage to various components located on the underside of the truck. Because the use of mud flaps is mandated by various federal and/or state laws, an apparatus is needed to releasably hold a mud flap such that when the mud flap becomes trapped and a downward force is exerted on the flap and mounting system, the mud flap disengages from the mounting system without damaging either the mud flap or the mounting system.

3. Related Art

There are numerous examples, including patents, of mud flap mounts that provide a mounting system for mud flaps. Some of these systems are designed to improve the splash characteristics of the mud splash. Other related art devices do address the problem of mud flaps being torn in half or from the vehicle or mount. However, some of these devices require specially designed mud flaps or fail to securely hold the mud flap in or to the mud flap mount during normal use, including when the mud flap is subject to wind, snow or ice loads. Specially designed mud flaps are, generally, more expensive and create a potential problem with ease of replacement.

None of the related art devices known to the inventor provide a mud flap mount designed and configured as the present invention. Specifically, none of the related art devices provide the same combination of a mount that releasably holds an insert member until a predetermined force is applied to the mud flap. The related art mud flap mounting systems that utilize an enlarged open area to hold a mud flap or mounting component having an enlarged area are configured such that the mud flap mount does not adequately hold the mud flap in place. These devices allow the mud flap or mounting component to be pulled out the mud flap mount when subjected to high wind loads, as occur during high speed driving on freeways. The weights applied to the mud flaps by many truckers to keep the mud flap hanging in a more vertical position compound the problem with many of the related art devices. For this reason, releasable mud flap mounts are not widely used and are difficult to locate for purchase, despite the fact that many millions of mud flaps are sold each year to persons needing to replace damaged mud flaps. The configuration of the components of the present invention provide a mud flap mount that holds the mud flap to the bottom of the vehicle until the predetermined level of force causes the mount to open and release the insert member.

SUMMARY OF THE INVENTION

The mud flap mount of the present invention provides an apparatus for releasably mounting a mud flap to a vehicle such that damage to the mud flap or vehicle is avoided. The present invention utilizes the angle bracket and mud flaps typically used on most vehicles, thereby allowing existing vehicle mud flap mounting systems to be easily and relatively inexpensively modified to utilize the invention set forth herein.

In its preferred embodiment, the present invention comprises a planar member that hangs vertically from the existing bracket, a shaped member that connects to the planar member to form a cavity having an opening at the bottom and an insert member that, during normal operation, is releasably held inside the cavity and connects to the mud flap. In the preferred embodiment, the shaped member comprises a first vertical member adjacent to the planar member, a cross member connected to one end of the first vertical member, a second vertical member attached to the opposite end of the cross member and an angled member attached to the free end of the second vertical member. The insert member has an enlarged upper section that is sized and configured to snugly fit inside the cavity and a lower section that hangs below the opening to connect to the mud flap. A spacer can be used between the planar member and the bracket to improve the opening characteristics of the mud flap mount. As set forth herein, other shapes for the cavity and insert member will also work with the present invention.

In the preferred embodiment, resilient material is used for the planar member and a stiff material for the shaped member, such that when a downward force of a predetermined amount is applied to the mud flaps the insert member will pull down on the mount, causing planar member to pull away from shaped member and release insert member from the cavity. The resilient planar member and stiff shaped member combination only permits the mud flap to be easily pulled from the mud flap mount in the direction of the tire. This prevents wind force pulling the mud flap out of the mount while driving on the highway. Snow and ice loads will also not pull the mud flap from the mount. However, with the proper amount of predetermined force, damage to the mud flap, bracket and vehicle are avoided when the mud flap is trapped between the tire and a curb or between the tire and the ground.

Accordingly, the primary objective of the present invention is to provide an apparatus suitable for allowing a mud flap to be pulled off a vehicle without damaging the mud flap or vehicle.

It is also an important objective of the present invention to provide an apparatus that utilizes a spring-like mechanism to forcibly hold a mud flap extension in place until such time as a predetermined amount of force is applied to the mud flap.

It is also an important objective of the present invention to provide a mud flap mounting device suitable for installation on a variety of vehicles and suitable for use with current mud flap mounting systems.

While not expressly set forth, other objectives of the present invention will be obvious to those skilled in the art and are hereby incorporated herein.

BRIEF DESCRIPTION OF THE DRAWINGS

In the drawings which illustrate the best modes presently contemplated for carrying out the present invention.

DETAILED DESCRIPTION OF THE PREFERRED EMBODIMENT

Figure 1:
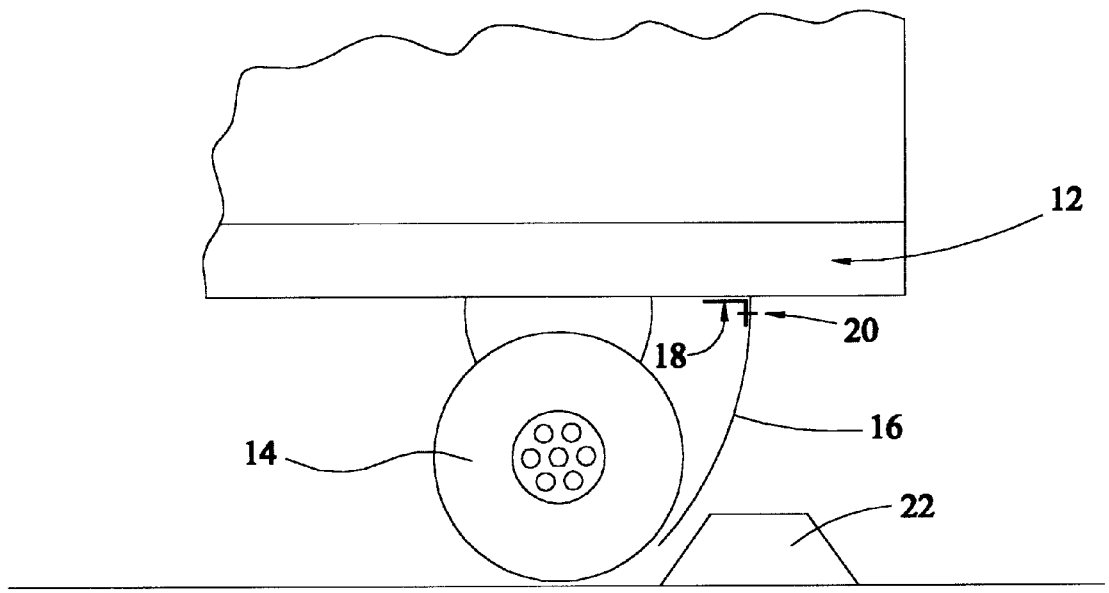
FIG. 1 illustrates the typical mud flap mount system currently utilized in the trucking industry.

With reference to the figures where like elements have been given like numerical designations to facilitate the reader's understanding of the present invention, the preferred embodiment of the present invention, designated generally as 10, is set forth below. The mud flap mount system currently utilized on vehicles, such as trucks, trailers and the like, by most persons in the trucking industry is shown in FIG. 1. Vehicle 12 having rear wheels 14 utilize mud flaps 16 to prevent rocks and other materials from hitting cars and trucks that are behind vehicle 12 when it is being driven. Attached to the underside of vehicle 12 is angle bracket 18. Mud flap 16 attaches to bracket 18 by use of a bolt and nut combination 20 or other suitable connecting devices. The problem that is the subject of the present invention typically occurs during backing procedures, shown in FIG. 1, when wheel 14 hits a object, such as curb 22 or the like, and traps mud flap 16 between wheel 14 and curb 22. Continued backing causes a high level of generally downward and forward force to be exerted on mud flap 16 and bracket 18. Depending upon the relative strength of mud flap 16 and bracket 18, one or both will break, requiring repair or replacement of the damaged component and causing down time while the repairs are made. In the worse case, the downward force also damages the underside of vehicle 12, thereby causing even increased costs and down time.

Figure 2:
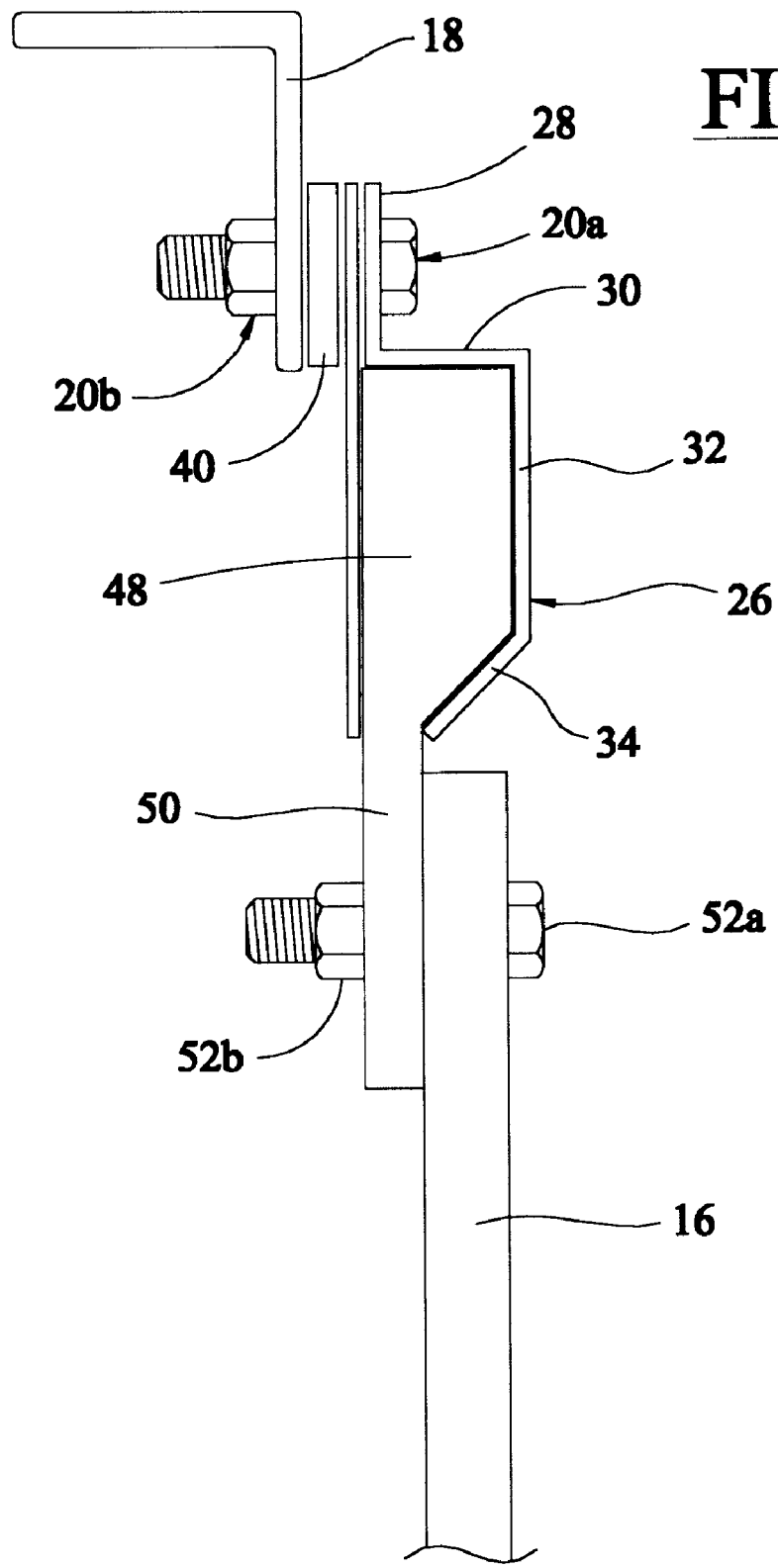
FIG. 2 is a side view illustrating the preferred embodiment of the present invention.
Figure 3:
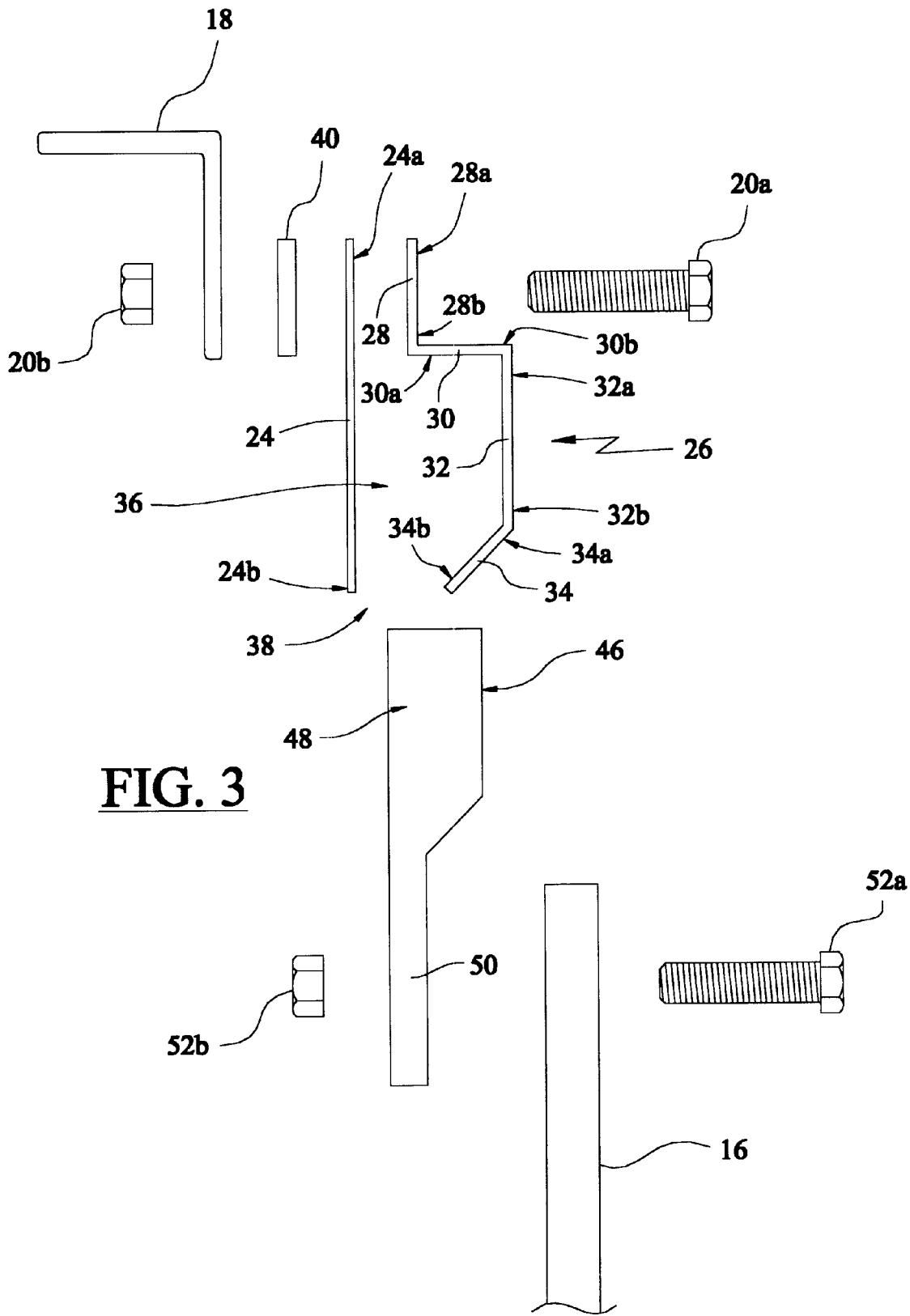
FIG. 3 is an exploded side view of the preferred embodiment of the present invention illustrated in FIG. 2.
Figure 4:
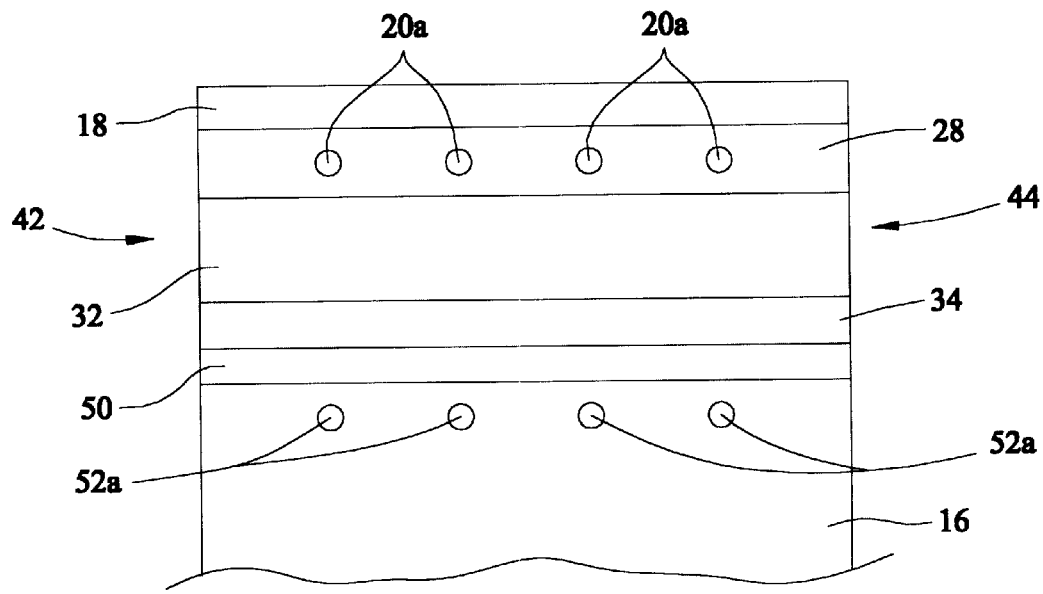
FIG. 4 is a view from the back of a vehicle utilizing the preferred embodiment of the present invention.

The primary embodiment of the present invention 10 is illustrated in FIGS. 2 through 4. Mud flap mount 10 comprises generally planar member 24, having upper end 24a and lower end 24b, and shaped member 26. Shaped member 26 comprises first vertical member 28, having upper end 28a and lower end 28b, cross member 30, having first end 30a and second end 30b, second vertical member 32, having upper end 32a and lower end 32b and downwardly angled member 34, having upper end 34a and lower end 34b. Second vertical member 32 can be substantially parallel to planar member 24 when mud flap mount is in its normal, non-flexed condition. First vertical member 28, cross member 30, second vertical member 32 and angled member 34 can be individual members that are joined together, i.e., by welding, or they can be manufactured integral to each other, such that shaped member 26 is a single unit. In the preferred embodiment, planar member 24 is made from a resilient material such as spring steel and shaped member 26 is a single unit made from a substantially non-resilient material, such as mild steel.

First vertical member 28 is placed adjacent to or abutting against upper end 24a of planar member 24. In this configuration, shaped member 26 and planar member 24 define cavity 36 that extends across the entire length of planar member 24 and shaped member 26. Angled member 34 extends in a downwardly direction towards planar member 24 from where upper end 34a of angled member 34 joins with lower end 32b of second vertical member 32. Lower end 34b of angled member 34 remains spaced apart from planar member 24 to form bottom opening 38.

To facilitate bending of planar member 24, spring spacer 40 can be used between planar member 24 and bracket 18. Spacer 40 separates planar member 24 from bracket 18 so planar member 24 can bend under bracket 18 when downward force is applied to mud flap 16, as described in more detail below. Bolt 20a and nut 20b can be utilized to connect first vertical member 28, upper end 24a of planar member 24 and spacer 40 to bracket 18 to utilize the mud flap mount 10 of the present invention. The typical mud flap configuration, as shown in FIG. 4, utilizes four bolt and nut combinations 20 spaced apart across the length of bracket 18. Other connection mechanisms well known to those in the art can also be utilized to connect the foregoing components to bracket 18.

Cavity 36 has ends 42 and 44, at least one of which should be open so that insert member 46 can slide into cavity 36 and be releasably held therein. Insert member 46 comprises an upper section 48 and lower section 50. In the preferred embodiment, upper section 48 is shaped and configured to be approximately the same cross-sectional dimension as cavity 36 across the entire length of shaped member 26. Upper section 48 should be wider than opening 38 so that angled member 34 and the friction between upper section 48 and planar member 24 and shaped member 26 supports insert member 46 inside cavity 36 while the vehicle is being driven or stored. Width of lower section 50 can be approximately equal to width of opening 38. The use of resilient material for planar member 24 and stiff material for shaped member 26, in conjunction with the enlarged upper section 48, substantially reduces the likelihood that wind loads or other rearward loads or relatively minor downward loads, such as from snow or ice on mud flap 16, will cause insert member 46 to improperly pull out of cavity 36. The use of upper section 48 with the configuration of shaped member 26 described above, increases the likelihood that insert member 46 will only be pulled from cavity 36 when mud flap 16 is subject to loads that are likely to damage mud flap 16, bracket 18 or vehicle 12.

Insert member 46 can be manufactured out of a variety of generally incompressible materials, including rubber, aluminum and steel. The inventor has found that a hardened rubber material works well because it is generally incompressible and not easily damaged when insert member 46 is pulled out of cavity 36. In addition, insert member 46 made of hardened rubber is generally less expensive to manufacture than out of other materials. Mud flap 16 is connected to lower section 50 of insert member 46. The typical connection, as shown in FIGS. 3 and 4, consists of four bolt 52a and nut 52b combinations 52.

During normal use, insert member 46 is slid into cavity 36 and supported by planar member 24 and shaped member 26. When vehicle 12 is backed against object 22 and a predetermined amount of force is met or exceeded, the downward force on mud flap 16 pulls insert member 46 out of cavity 36. Mud flap mount 10 must be designed such that insert member 46 is pulled out of cavity 36 before mud flap 16, bracket 18 or vehicle 12 is damaged. To re-install mud flap 16 to vehicle 12, the user only has to slide insert member 46 back into cavity 36. This procedure can be performed quickly and without the need for tools or assistance, thereby saving the repair costs and eliminating unproductive down time.

The typical mud flap 16 is approximately twenty-four inches wide. The various components of mud flap mount 10 of the present invention should be made approximately the same width. Although a number of combinations of dimensions are suitable for the present invention, the inventor has found that the following approximate dimensional relationships work well: first vertical member 28—one inch; cross member 30—one inch; total vertical length of second vertical member 32 and angled member 34—two inches; planar member—three inches; width of upper section 48 of insert member 46—seven eighths of an inch; width of lower section 50—three eighths of an inch; height of lower section 50—one and one fourth of an inch; and spacer 40—one and one fourth inch wide by one inch height.

The amount of force that is required to pull insert member 46 out of cavity 36 without damaging mud flap 16, bracket 18 or vehicle 12 is critical to the success of the present invention 10. The upward force of planar member 24 and shaped member 26, including friction, must be sufficient to hold insert member 46 in cavity 36 when the vehicle 12 is in use. This use must take into consideration that often mud flaps 16 accumulate ice and snow on them. The inventor has performed several tests on various mud flaps 16 currently available and has found that an apparatus that releases insert member 46 when the amount of downward force on mud flap 16 is approximately equal to 250 pounds will usually be sufficient to avoid any damage, yet strong enough to keep insert member 46 in cavity 36 during use.

In use, the vehicle operator or owner merely removes existing mud flap 16 from bracket 18 by removing nuts 20b from bolts 20a. Spacer 40, upper end 24a of planar member 24 and first vertical member 28 of shaped member 26 are bolted to bracket 18 using the same nut and bolt combinations 20 or some equivalent thereto. Mud flap 16 is bolted to lower section 50 of insert member 46 using the nut and bolt combinations 20 removed earlier or connectors equivalent thereto. Upper section 48 of insert member 46 is then slid into cavity 36. When the mud flap 16 is pulled out of mount 10, the operator or owner only has to slide upper section 48 of insert member 46 back into cavity 36.

Figure 5:
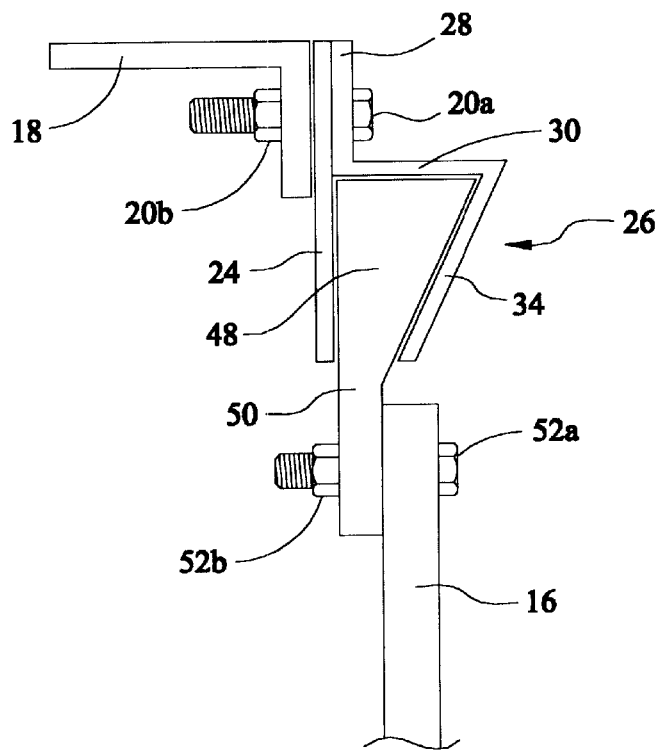
FIG. 5 is a side view of an alternative embodiment of the present invention.

An alternative embodiment of the present invention is shown in FIG. 5. In this embodiment, mud flap mount 10 utilizes angled member 34 that connects directly to cross member 30, thereby eliminating second vertical member 32. Upper end 34a of angled member 34 connects to second end 30b of cross member 30 and converges toward lower end 24b of planar member 24 to form cavity 36 and bottom opening 38. Upper section 48 of insert member 46 must be reconfigured to correspond to the shape of cavity 36. This embodiment should have the advantage of being less expensive to manufacture, but it is not likely to be as strong.

Another alternative embodiment utilizes a specially manufactured mud flap 16 that has an upper end which is shaped like upper section 48 of insert member 46. With use of such a mud flap, the user could eliminate the separate insert member 46. Use of a specially designed mud flap 16, while perhaps less expensive for the mud flap mount 10, may substantially decreases the user's flexibility as to mud flaps. The preferred embodiment of the present invention works well with all known existing trailer mounts, truck mounts and mud flaps.

Another alternative embodiment to the present invention includes the use of other shapes for shaped member 26 and upper section 48. For instance, shaped member 26 and upper section 48 can be semi-spherical, triangular or square. With planar member 24 made of resilient material, the enlarged upper section 48 that fits into shaped member 26 will work well with a variety of shapes. The combination of the shape, enlarged portion of insert member 46 and the resilient planar member ensures that the mud flap mount 10 will only disengage mud flap 16 when the force is the downward/forward force that results when the mud flap becomes stuck between the wheel and curb, the truck body and a loading dock, and between the wheel and the ground or other similar events. Naturally, if a mud flap 16 having an enlarged upper section is designed to replace insert member 46, then the enlarged upper section and shaped member 26 can also have the various shaped configurations discussed above.

While there is shown and described herein certain specific alternative forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to the dimensional relationships set forth herein and modifications in assembly, materials, size, shape and use.

What is claimed is:

1. A mud flap mount for mounting a mud flap to a bracket on a vehicle, comprising:

a planar member having an upper end and a lower end, said upper end of said planar member configured to attach to the bracket, said lower end of said planar member extending generally downward from the vehicle;

a shaped member attached to said upper end of said planar member, said planar member and said shaped member defining an elongated cavity having at least one open end and a bottom opening, said shaped member comprising a first vertical member adjacent to said upper end of said planar member, a cross member attached at a first end to a lower end of said first vertical member and an angled member attached at an upper end to a second end of said cross member opposite said first end, said angled member having a lower end opposite said upper end, said lower end of said angled member converging toward said lower end of said planar member but remaining spaced apart from said lower end of said planer member, said bottom opening defined by the space between said lower end of said planar member and said lower end of said angled member;

connecting means for connecting said upper end of said planar member and said shaped member to the bracket; and an insert member having an upper section and a lower section, said upper section having a cross-sectional width greater than the width of said bottom opening, said upper section sized and configured to be slidably received through said at least one open end of said cavity, said upper section sized and configured to be released through said bottom opening when a force on the mud flap exceeds a predetermined value and causes the width of said bottom opening to increase, said lower section configured to extend below said cavity and releasably attach to the mud flap.

2. The mud flap mount according to claim 1, wherein said planar member is made from a resilient material and said shaped member is made from a non-resilient material, said planar member being displaced away from said shaped member when said predetermined amount of said force is applied to the mud flap.

3. The mud flap mount according to claim 1 further comprising a second vertical member interposed between said second end of said cross member and said upper end of said angled member.

4. The mud flap mount according to claim 3, wherein said second vertical member is substantially parallel to said planar member when said planar member is in a non-flexed condition.

5. The mud flap mount according to claim 1 further comprising a spacer member interposed between said upper end of said planar member and the bracket on the vehicle.

6. The mud flap mount according to claim 1, wherein said upper section of said insert member is sized and configured to substantially equal the volume of said cavity.

7. The mud flap mount according to claim 1, wherein said cross-sectional width of said lower section is substantially equal to the width of said opening.

8. The mud flap mount according to claim 1, wherein said predetermined value of said force is approximately 250 pounds.

9. The mud flap mount according to claim 1, wherein said cross-sectional width of said upper section of said insert member is approximately twice the width of said bottom opening.

10. The mud flap mount according to claim 1, wherein the width of each of said planar member, said shaped member and said insert member is substantially equal to the width of the mud flap.

11. The mud flap mount according to claim 1, wherein said lower section of said insert member is generally planar.

12. A mud flap mount for mounting a mud flap to a bracket on a vehicle, comprising:

a planar member having an upper end and a lower end, said upper end of said planar member configured to attach to the bracket, said lower end of said planar member extending generally downward from the vehicle;

a shaped member having a first vertical member adjacent to said upper end of said planar member, a cross member attached at a first end to a lower end of said first vertical member, a second vertical member attached at an upper end to a second end of said cross member opposite said first end and an angled member attached at an upper end to a lower end of said second vertical member, said angled member having a lower end opposite said upper end, said lower end of said angled member converging toward said lower end of said planar member but remaining spaced apart from said lower end of said planer member, said planar member and said shaped member defining an elongated cavity having at least one open end and a bottom opening, said bottom opening defined by the space between said lower end of said planar member and said lower end of said angled member;

connecting means for connecting said upper end of said planar member and said first vertical member to the bracket; and an insert member having an upper section and a lower section, said upper section having a cross-sectional width greater than the width of said bottom opening, said upper section sized and configured to be slidably received through said at least one open end of said cavity, said upper section sized and configured to be released through said bottom opening when a force on the mud flap exceeds a predetermined value and causes the width of said bottom opening to increase, said lower section configured to extend below said cavity and releasably attach to the mud flap.

13. The mud flap mount according to claim 12 further comprising a spacer member interposed between said upper end of said planar member and the bracket on the vehicle.

14. The mud flap mount according to claim 12, wherein said predetermined value of said force is approximately 250 pounds.

15. The mud flap mount according to claim 12, wherein said planar member is made from a resilient material and said shaped member is made from a non-resilient material, said planar member being displaced away from said shaped member when said predetermined amount of said force is applied to the mud flap.

16. The mud flap mount according to claim 12, wherein said cross-sectional width of said upper section of said insert member is approximately twice the width of said bottom opening.

17. A mud flap mount for mounting a mud flap to a bracket on a vehicle, comprising:

a planar member having an upper end and a lower end, said upper end of said planar member configured to attach to the bracket, said lower end of said planar member extending generally downward from the vehicle, said planar member being made from a resilient material;

a spacer member interposed between said upper end of said planar member and the bracket on the vehicle;

a shaped member having a first vertical member adjacent to said upper end of said planar member, a cross member attached at a first end to a lower end of said first vertical member, a second vertical member attached at an upper end to a second end of said cross member opposite said first end and an angled member attached at an upper end to a lower end of said second vertical member, said angled member having a lower end opposite said upper end, said lower end of said angled member converging toward said lower end of said planar member but remaining spaced apart from said lower end of said planer member, said planar member and said shaped member defining an elongated cavity having at least one open end and a bottom opening, said bottom opening defined by the space between said lower end of said planar member and said lower end of said angled member;

connecting means for connecting said upper end of said planar member and said first vertical member to the bracket; and an insert member having an upper section and a lower section, said upper section having a cross-sectional width greater than the width of said bottom opening, said upper section sized and configured to substantially equal the volume of said cavity and to be slidably received through said at least one open end of said cavity, said upper section sized and configured to be released through said bottom opening when a force on the mud flap exceeds a predetermined value and causes said planar member to be displaced away from said shaped member and increase the width of said bottom opening, said lower section configured to extend below said cavity and releasably attach to the mud flap.

18. The mud flap mount according to claim 17, wherein said predetermined value of said force is approximately 250 pounds.

19. The mud flap mount according to claim 17, wherein said cross-sectional width of said upper section of said insert member is approximately twice the width of said bottom section.

* * * * *